(12) United States Patent
Bourane et al.

(10) Patent No.: US 8,623,199 B2
(45) Date of Patent: Jan. 7, 2014

(54) CLAY ADDITIVE FOR REDUCTION OF SULFUR IN CATALYTICALLY CRACKED GASOLINE

(75) Inventors: Abdennour Bourane, Ras Tanura (SA); Omer Refa Koseoglu, Dhahran (SA); Musaed Salem Al-Ghrami, Dhahran (SA); Christopher F. Dean, Dhahran (SA); Mohammed Abdul Bari Siddiqui, Dhahran (SA); Shakeel Ahmed, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 1082 days.

(21) Appl. No.: 12/462,338

(22) Filed: Jul. 30, 2009

(65) Prior Publication Data

US 2010/0032343 A1 Feb. 11, 2010

Related U.S. Application Data

(63) Continuation-in-part of application No. 11/477,275, filed on Jun. 28, 2006, now Pat. No. 8,409,428.

(60) Provisional application No. 61/137,471, filed on Jul. 30, 2008.

(51) Int. Cl.
*C10G 45/04* (2006.01)

(52) U.S. Cl.
USPC .................................. 208/213; 208/208 R

(58) Field of Classification Search
None
See application file for complete search history.

(56) References Cited

U.S. PATENT DOCUMENTS

| | | |
|---|---|---|
| 4,085,030 A | 4/1978 | Green et al. |
| 4,176,090 A | 11/1979 | Vaughan et al. |
| 4,271,043 A | 6/1981 | Vaughan et al. |
| 4,280,893 A | 7/1981 | Leas |
| 4,305,809 A | 12/1981 | Chen et al. |
| 4,499,195 A | 2/1985 | Wheelock |
| 4,661,464 A | 4/1987 | Atkins |
| 4,772,378 A | 9/1988 | Miyauchi et al. |
| 5,376,608 A | 12/1994 | Wormsbecher et al. |
| 5,525,210 A | 6/1996 | Wormsbecher et al. |
| 6,036,847 A | 3/2000 | Ziebarth et al. |
| 6,090,274 A | 7/2000 | Wu et al. |
| 6,215,035 B1 | 4/2001 | Choudhary et al. |
| 6,482,315 B1 | 11/2002 | Roberie et al. |
| 6,497,811 B1 | 12/2002 | Myrstad et al. |
| 6,635,168 B2 | 10/2003 | Zhao et al. |
| 6,635,169 B1 | 10/2003 | Bhore et al. |
| 6,670,058 B2 | 12/2003 | Muradov |
| 6,790,343 B2 | 9/2004 | Wang et al. |
| 7,033,487 B2 | 4/2006 | O'Connor et al. |
| 7,347,929 B2 | 3/2008 | Vierheilig et al. |
| 7,347,930 B2 | 3/2008 | Long et al. |
| 7,361,264 B2 | 4/2008 | Vierheilig |
| 2002/0051878 A1 | 5/2002 | Lussier et al. |
| 2004/0029717 A1 | 2/2004 | O'Conner et al. |
| 2004/0266608 A1 | 12/2004 | Long et al. |
| 2005/0121363 A1 | 6/2005 | Vierheilig et al. |
| 2007/0138062 A1 | 6/2007 | Varma et al. |
| 2008/0000807 A1 | 1/2008 | Dean et al. |

FOREIGN PATENT DOCUMENTS

| | | |
|---|---|---|
| EP | 798362 A1 | 10/1997 |
| WO | 9709113 A1 | 3/1997 |
| WO | 9920712 A1 | 4/1999 |
| WO | 0142320 A1 | 6/2001 |
| WO | 2006131507 A1 | 12/2006 |

OTHER PUBLICATIONS

Andersson et al., "Cracking Catalyst Additives for Sulfur Removal From FCC Gasoline," Elsevier, Catalysis Today, 53, 1999, pp. 565-573.
Hernandez-Beltran et al., "Effect of Highly Reactive Sulfur Species on Sulfur Reduction in Cracking Gasoline," Elsevier, Applied Catalysis B: Environmental 42, 2003, pp. 145-154.
Hernandez-Beltran et al., "Sulfur Reduction in Cracked Naphtha by a Commercial Additive," Elsevier, Applied Catalysis B: Environmental 34, 2001, pp. 137-148.
Lesemann et al., "Noncapital Intensive Technologies Reduce FCC Sulfur Content," Hydrocarbon Processing, Feb. 2003, pp. 69-76.
Schoonheydt et al., "Pillared Clays and Pillared Layered Solids," Pure and Applied Chemistry, vol. 71, No. 12, 1999, pp. 2367-2371.
Siddiqui et al., "Sulfur Reduction in FCC Gasoline Using Catalyst Additives," Applied Catalysis, 303, 2006, pp. 116-120.
PCT/US09/04433 International Search Report, Sep. 24, 2009, pp. 1-8.

*Primary Examiner* — Tam M Nguyen
(74) *Attorney, Agent, or Firm* — Abelman, Frayne & Schwab

(57) ABSTRACT

Compositions and processed for their use as additives for reducing the sulfur content of FCC gasoline employ a support material having deposited on its surface (a) a first metal component from Group IIB of the Periodic Table and (b) a second metal component from Group III or Group IV of the Periodic Table. The additive composition is preferably made of a montmorillonite clay support containing zinc and gallium, zinc and zirconium. Alternatively, the additive composition includes support material having deposited on its surface a metal component from Group III of the Periodic Table, preferably a montmorillonite clay support containing gallium. The clay is impregnated with the metal(s) using the known incipient wetness method and the dried powdered additive composition is preferably formed into shapes suitable for use in the FCC unit.

4 Claims, 3 Drawing Sheets

CLAY ADDITIVE FOR REDUCTION OF SULFUR IN CATALYTICALLY CRACKED GASOLINE

RELATED APPLICATIONS

This application is related to and claims priority from United Stated Provisional Patent Application Ser. No. 61/137,471 filed on Jul. 30, 2008, and is a Continuation-in-Part of U.S. application Ser. No. 11/477,275 filed on Jun. 28, 2006, now U.S. Pat. No. 8,409,428, which are both incorporated by reference herein in their entireties.

BACKGROUND OF THE INVENTION

1. Field of the Invention

This invention relates to the reduction of sulfur in gasoline produced in a fluid catalytic cracking process and, more particularly, to a method and composition for use in the fluid catalytic cracking process using a sulfur reduction additive composition.

2. Description of Related Art

Fluid catalytic cracking (FCC) is the largest refining process used for gasoline production with global capacity of more than 14.2 million barrels per day. The process converts heavy feedstocks such as vacuum distillates, residues, and deasphalted oil into lighter products, which are rich in olefins and aromatics. FCC catalysts are typically solid acids of fine-particles especially zeolites (synthetic Y-faujasite), aluminum silicate, treated clay (kaolin), bauxite, and silica-alumina. The zeolite content in commercial FCC catalysts is generally in the range of 5-40 weight %, or greater, while the balance is silica-alumina amorphous matrix. Additives to the FCC process usually amount to no more than 10% of the catalyst, and they are basically used to enhance octane, as metal passivators, $SO_x$ reducing agents, CO oxidation and, recently, for gasoline sulfur reduction.

Stringent environmental regulations that target the reduction of the sulfur content of automobile gasoline and tailpipe emissions are being enforced worldwide. Sulfur in gasoline increases $SO_x$ emissions in combustion gases, reduces the activity of vehicle catalytic converters, and promotes corrosion of engine parts. The upper limit of sulfur in gasoline in the United States and the European Union has been set at 10 parts per million (ppm) as a refinery average, and many other countries have also decreased the permitted sulfur specifications in transportation fuels.

A number of options are available for the reduction of sulfur in gasoline. The main options are hydrotreating the FCC feed, hydrotreating product naphtha, lowering the end boiling point of FCC gasoline, and the use of sulfur-reducing additives in FCC catalysts. The first two options are highly capital intensive. A disadvantage regarding the third option is that the lowering of end boiling point will also reduce the octane number, in addition to reducing the yield of gasoline. From an economic point of view, the last option is the most desirable since this will selectively desulfurize the gasoline fraction without the need for additional treatment. It has been reported that sulfur reduction by FCC additives or catalysts offers economic advantages over the standard solution-selective gasoline hydrotreating or hydrodesulfurization methods.

Various catalytic materials for effecting a sulfur reduction have been developed for use during the FCC process. The sulfur reduction component may be a separate additive to the FCC catalyst or part of an FCC sulfur reduction catalyst. However, the levels of sulfur in gasoline are still not low enough to meet current and proposed regulatory requirements and, accordingly, are unacceptable.

Catalyst additives for the reduction of sulfur in FCC gasoline products were proposed by Wormbecher in U.S. Pat. No. 5,376,608 and Kim in U.S. Pat. No. 5,525,210, the disclosures of which are incorporated by reference, using a cracking catalyst additive of an alumina-supported Lewis acid for the production of reduced-sulfur gasoline. It was also disclosed that the Lewis acid may comprise components and compounds including Zn, Cu, Ni, Ag, Cd and Ga deposited on aluminum oxide. However, this system has not achieved significant commercial success.

Another composition is that disclosed in U.S. Pat. No. 6,036,847 to Ziebarth et al., the disclosure of which is incorporated herein by reference, used 10 weight % of a mixture including particles of Zn supported on alumina and titania particles as an additive in the cracking of 2.7 weight % sulfur vacuum gas oil (VGO) feed. The results indicated that the combination of alumina-supported Lewis acid component and titania-containing component resulted in greater sulfur reduction than the use of either component alone.

Myrstad et al. in U.S. Pat. No. 6,497,811, the disclosure of which is incorporated herein by reference, disclosed a composition of a hydrotalcite material impregnated with a Lewis acid, and optionally an FCC-catalyst, as a sulfur-reducing additive. The Lewis acid included transition metals elements and compounds, including Zn, Cu, Ni, Co, Fe and Mn.

Another additive disclosed by Roberie et al. in U.S. Pat. No. 6,482,315, the disclosure of which is incorporated herein by reference, discloses a composition comprising vanadium supported on a refractory inorganic oxide. When using 2 weight % vanadium-containing additive, a 33% reduction in gasoline sulfur was reported.

Various papers, published by Andersson, P. et al., Catalysis Today 53:565 (1991), Beltran F. et al, *Applied Catalysis Environmental* 34:137 (2001) and 42: 145 (2003), relate in only a very general manner to the concept of the present invention.

Notwithstanding the reported sulfur-reducing catalysts, there remains a need for effective and economical catalysts for reducing sulfur from gasoline in a commercially sustainable manner.

Therefore, it is an object of the present invention to provide a sulfur-reducing composition and a method for the use of same which provides a gasoline with a significantly lower sulfur level, when compared to the sulfur reduction activity of a conventionally used FCC catalyst in the FCC process.

SUMMARY OF THE INVENTION

The present invention provides additive compositions for reducing the sulfur content of FCC gasoline and processes using the compositions. In one aspect of the present invention, the sulfur reduction additive composition comprises a support material having deposited on its surface (a) a first metal component from Group IIB of the Periodic Table and (b) a second metal component from Group III or Group IV of the Periodic Table. The composition is most preferably made of a montmorillonite clay support on which zinc and gallium or zinc and zirconium are impregnated.

In another aspect, the composition comprises a support material having deposited on its surface a metal component from Group III of the Periodic Table. The composition is most preferably made of a montmorillonite clay support on which only gallium is impregnated.

Preferably, the support material is an amorphous or inorganic oxide such as, for example, $Al_2O_3$, clays, or mixtures thereof. In certain preferred embodiments, the support material is montmorillonite clay.

The metal or metals are impregnated or dispersed on the surface of the clay particles by any suitable conventional process, e.g., the incipient wetness method.

The sulfur reduction additive composition is used as a separate additive in combination with the conventional fluid catalytic cracking catalyst, which is normally a faujasite, such as zeolite Y, to crack hydrocarbon feeds in the FCC unit to produce low-sulfur gasoline and other liquid cracking products.

BRIEF DESCRIPTION OF THE DRAWINGS

The invention will be described in further detail below and with reference to the attached drawings in which.

DETAILED DESCRIPTION OF THE INVENTION

Figure 1:
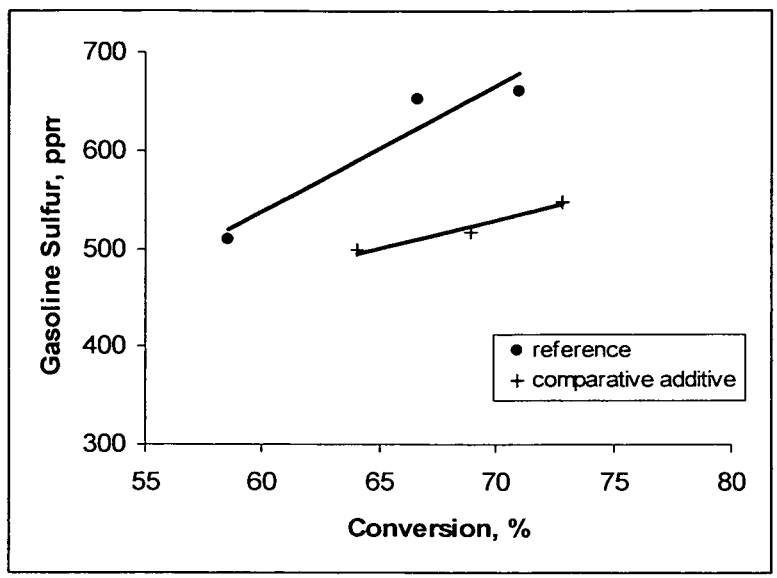
FIG. 1 is a plot of the sulfur content of product gasoline fractions obtained with a conventional FCC catalyst without any additive as a reference material, and a mixture of the FCC catalyst with a commercial additive, as a comparative material, versus percent conversion.

In accordance with the present invention, the sulfur content of an FCC gasoline is reduced to lower levels by the use of the additive composition of the invention mixed with a conventional FCC catalyst. The FCC catalyst is preferably made of powder and generally possesses an average particle size in the range of 50-100 microns and a bulk density in the range of 0.5-1.0 kg/L. It is preferred that the particle size, density, shape and mechanical strength of the catalyst additive composition of the present invention is the same as a conventional FCC catalyst in which the composition is to be physically mixed.

The support material of the additive compositions of the present invention is preferably a montmorillonite clay possessing a surface area in the range of 150-350 $m^2/g$. Clay material itself possesses considerable capacity to reduce sulfur in gasoline fraction. However, the reduction in the benzothiophene fraction is typically minimal. It was observed that the impregnation of only a Lewis acid component onto the clay did not significantly increase either overall sulfur reduction capacity or the reduction of benzothiophene.

It was also observed that use of an additive composition of the clay material that was impregnated with zinc and a metal from Group III of the Periodic Table, such as Ga, or Group IV, such as Zr, did further reduce the sulfur content of the gasoline fraction which was catalytically cracked in the FCC unit. The clay material undergoes a drying step to produce shaped bodies suitable for use in the reduction of sulfur from gasoline and it can also be used alone as the gasoline sulfur reduction additive composition.

It was further that use of an additive composition of the clay material that was impregnated with a metal from Group III of the Periodic Table, such as Ga, reduced the sulfur content of the gasoline fraction that was catalytically cracked in an FCC unit.

In order to further illustrate the present invention and the advantages thereof, the following specific examples are presented. The examples are presented as specific embodiments of the claimed invention. It should be understood, however, that the invention is not limited to the specific details set forth in the examples. The examples illustrate the preparation and evaluation of the catalytic activity specific additive compositions for reducing sulfur content of a catalytically cracked gasoline fraction in a typical FCC unit.

The conventional cracking catalyst particles preferably contain at least one cracking catalyst component which is catalytically active for the cracking of hydrocarbons in the absence of added hydrogen. The cracking catalyst component can comprise a zeolite, a non-zeolite molecular sieve, a catalytically active amorphous silica alumina species, or a combination thereof. In certain embodiments, the cracking catalyst component is a Y-type zeolite selected from the group consisting of Y, USY, (described in U.S. Pat. No. 3,293,192, which is incorporated herein by reference), REY and RE-USY (described in U.S. Pat. Nos. 3,867,307 and 3,676,368, both of which are incorporated herein by reference) and mixtures thereof. The cracking catalyst particles can also contain one or more matrix components such as clays, modified clays, alumina, and the like. The cracking catalyst particles can also contain a binder such as an inorganic oxide sol or gel. The cracking catalyst particles generally contain at least 5 weight %, and in certain embodiments about 5 weight % to about 50 weight %, of the cracking catalyst component.

EXAMPLES

Micro activity test (MAT) evaluations of FCC catalyst/additive mixtures were carried out according to ASTM method D-3907, at a reaction temperature of 510° C. and a injection time of 30 seconds for a catalyst-to-oil ratio between 3 to 5, to obtain a conversion to gasoline of 55 to 75% of the original feed. The feed used was a vacuum gas oil of Arabian light crude origin. The sulfur content of this feed was 2.5 weight percent. Other properties of this feed are shown in Table 1. The sulfur content of the gasoline fraction was measured by GC-SCD. For comparison purposes, the sulfur content of the gasoline fraction was calculated at 71% conversion level. The montmorillonite clay was calcined in air at 550° C. to remove physically adsorbed water. Calcinations at 550° C. did not result in a significant increase in the surface area.

TABLE 1

Properties of vacuum gas oil (VGO).

| Property | Value |
| --- | --- |
| Density (g/cc)gg | 0.882 |
| API | 29.1 |
| Carbon (wt %) | 85.08 |
| Hydrogen (wt %) | 12.08 |
| Sulfur (wt %) | 2.46 |

TABLE 1-continued

Properties of vacuum gas oil (VGO).

| Property | Value |
|---|---|
| Nitrogen (wt %) | 960 |
| Initial Boiling Point (° C.) | 214 |
| Final Boiling Point (° C.) | 588 |

Example 1

Sulfur Content of Gasoline Fraction Obtained with Use of a Conventional FCC Catalyst A steamed, conventional, commercial FCC zeolite catalyst, a typical low RE-USY type available from any FCC catalyst supplier, was evaluated in the MAT according to ASTM D 3907. FIG. 1 shows the plot of gasoline sulfur content versus percent conversion obtained with only the conventional catalyst without any additive composition. This sulfur content is taken as a reference.

Example 2

Sulfur Reduction with a Commercially Available Additive Composition

A commercial sulfur reduction additive composition generally available from a catalyst supplier, for example, Albemarle, CCIC, Englehard, Grace Davison, or Intercat, labeled as comparative additive composition in the tables, was added (10 weight %) to the same steamed conventional FCC catalyst, namely, low RE-USY, as in Example 1 and was tested in MAT under the same conditions as in Example 1. The sulfur content of the gasoline fraction in this Example 2 is compared to the reference sulfur content in FIG. 1. At a conversion to gasoline of 71%, the overall sulfur reduction achieved, including benzothiophene, was 16%. Table 2 lists the sulfur content of the gasoline fraction for all the additive compositions.

Example 3

Sulfur Reduction of FCC Naphta with the Base Material of the Present Invention

Figure 2:
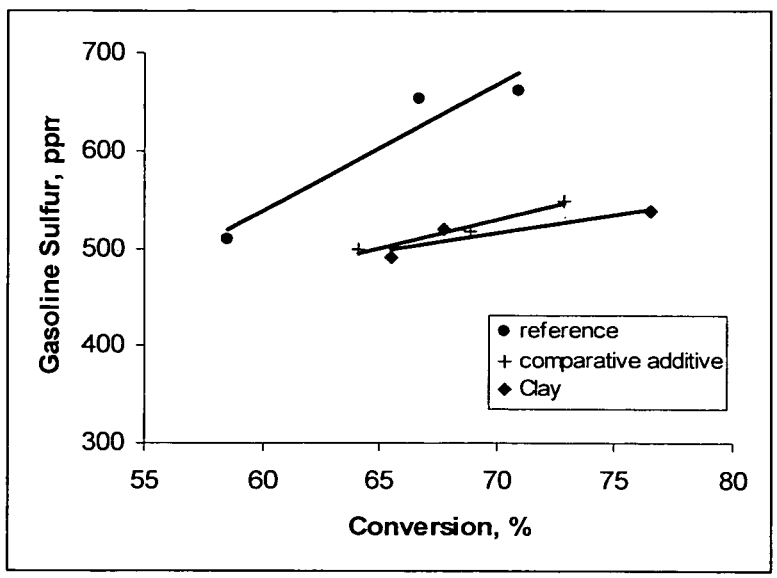
FIG. 2 is a plot of the sulfur content of product gasoline fractions obtained with the reference material and the comparative material of FIG. 1, and a base clay material used in additive compositions of the present invention, versus percent conversion.

To measure the sulfur reduction capability of the support material, montmorillonite clay itself was mixed with a conventional catalyst, a typical RE-USY type available from any FCC catalyst supplier, and evaluated in MAT. The results obtained, which are shown in FIG. 2, were compared with the reference. Montmorillonite demonstrated a significant sulfur reduction capability. As reported in Table 2, the sulfur content of the product gasoline fraction was reduced by 21%.

Example 4

Results Obtained by Use of Zinc-Impregnated Clay

Figure 3:
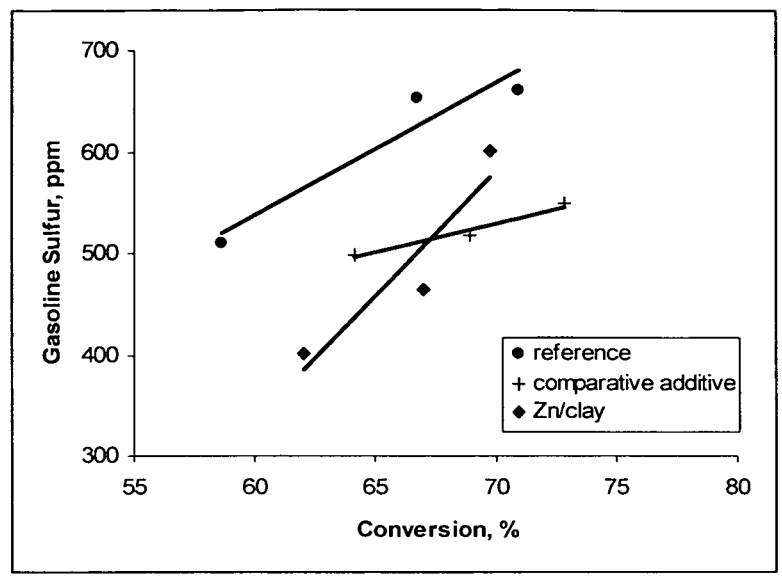
FIG. 3 is a plot of the sulfur content of product gasoline fractions obtained with a zinc impregnated-base material, the reference material and the comparative material, versus percent conversion.

An additive composition was prepared by impregnating 3 weight % Zn on montmorillonite clay by the incipient wetness method. A quantity of 10 weight % of this composition was mixed with the same commercial catalyst, a typical low RE-USY type, available from any FCC catalyst supplier, as in Example 1 and tested in MAT. FIG. 3 compares the sulfur content of gasoline obtained by using the composition of Example 4 with that obtained with use of the reference catalyst and the composition of Example 3. It is seen that sulfur reduction capability of this composition of Example 4 is similar to the composition of Example 3. At 71% gasoline conversion, product gasoline sulfur was reduced by 21%, as reported in Table 2.

Example 5

Results Obtained by Use of Clay Impregnated with Zinc and Zirconium

Figure 4:
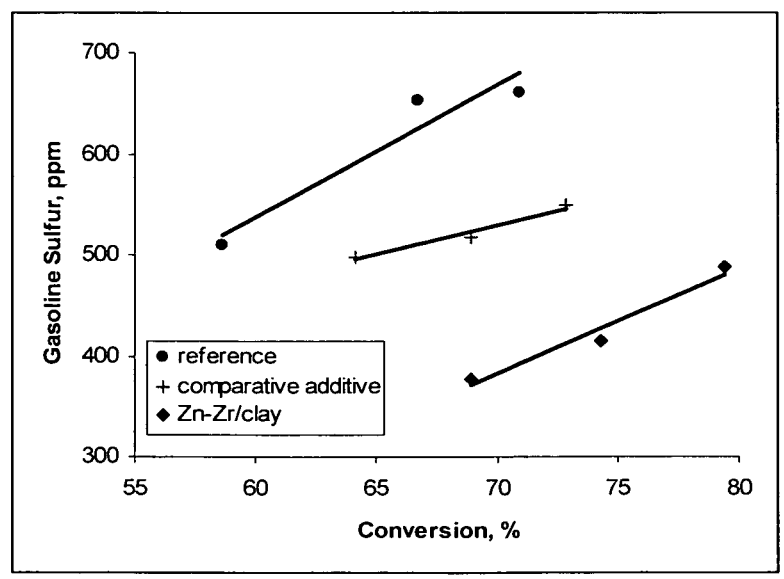
FIG. 4 is a plot of the sulfur content of product gasoline fractions obtained with the reference material and the comparative material of FIG. 1, and a zinc and zirconium impregnated base material, versus percent conversion.

An additive composition of the invention was prepared by impregnating 3 weight % Zn and 1 weight % Zr on montmorillonite clay by the incipient wetness method. A quantity of 10 weight % of this composition was mixed with the same commercial catalyst, a typical low RE-USY type, available from any FCC catalyst supplier, as in Example 1 and tested in MAT. FIG. 4 compares the sulfur content of gasoline obtained using the composition of Example 5 with that obtained by use of the reference catalyst and the composition of Example 4. It is seen that sulfur reduction capability of this composition is higher than the composition of Example 4. At 71% conversion to gasoline, product gasoline sulfur was reduced by 40%, as reported in Table 2.

Example 6

Results Obtained by Use of Gallium-Impregnated Clay

Figure 5:
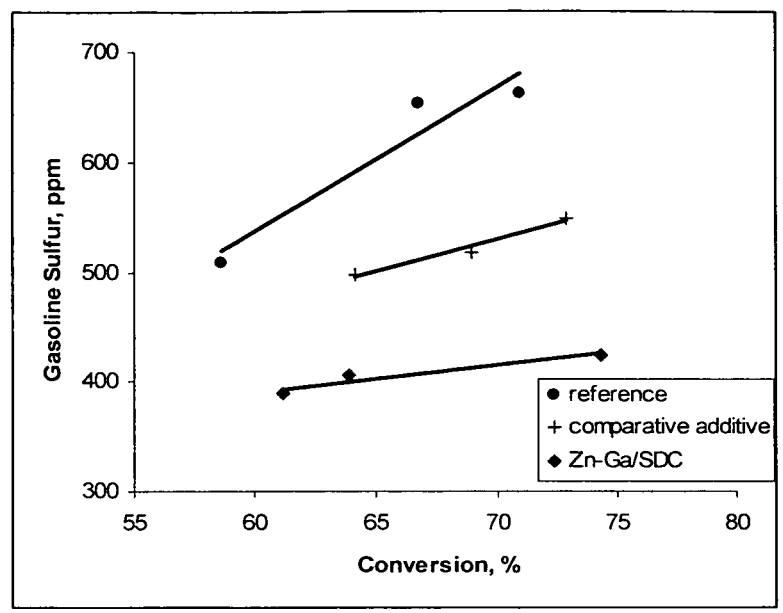
FIG. 5 is a plot of the sulfur content of product gasoline fractions obtained with the reference material and the comparative material of FIG. 1, and a gallium impregnated base material, versus percent conversion.

An additive composition of the invention was prepared by impregnating 3 weight % Ga on montmorillonite clay by the incipient wetness method. A quantity of 10 weight % of this composition was mixed with the same commercial catalyst, a typical low RE-USY type, available from any FCC catalyst supplier, as in Example 1 and tested in MAT. FIG. 5 compares the sulfur content of gasoline obtained using the composition of Example 6 with that obtained by use of the reference catalyst and the composition of Example 3. It is seen that sulfur reduction capability of this composition is superior to the composition of Example 4. At 71% conversion, product gasoline sulfur was reduced by 38%, as reported in Table 2.

Example 7

Results Obtained by Use of Clay Impregnated with Zinc and Gallium

Figure 6:
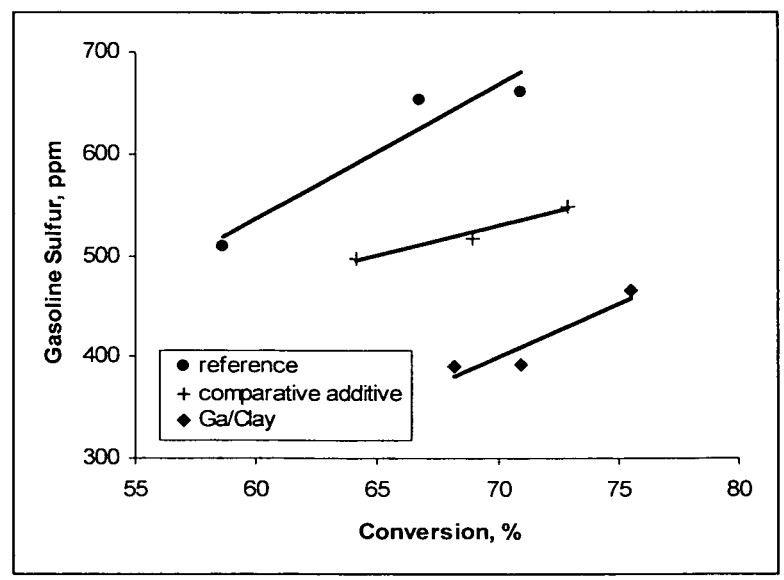
FIG. 6 is a plot of the sulfur content of product gasoline fractions obtained with the reference material and the comparative material of FIG. 1, and a zinc and gallium impregnated base material, versus percent conversion.

An additive composition was prepared by impregnating 3 weight % Zn and 1 weight % Ga on montmorillonite clay by the incipient wetness method. A quantity of 10 weight % of this composition was mixed with the same commercial catalyst, a typical low RE-USY type, available from any FCC catalyst supplier, as in Example 1 and tested in MAT. FIG. 6 compares the sulfur content of gasoline obtained using the additive composition of Example 7 with that obtained by use of the reference catalyst and the additive composition of Example 4. It is seen that sulfur reduction capability of this additive composition is higher than the additive composition of Example 4. At 71% gasoline conversion, product gasoline sulfur was reduced by 39%, as reported in Table 2.

TABLE 2

Sulfur content of gasoline fraction and percent reduction in sulfur content

| Additive Composition | Sulfur content | % reduction |
| --- | --- | --- |
| Reference Material (no additive composition) | 659 | 0 |
| Comparative | 553 | 16 |
| Clay | 523 | 21 |
| Zn/Clay | 520 | 21 |
| Ga/Clay | 410 | 38 |
| Zn—Zr/Clay | 393 | 40 |
| Zn—Ga/Clay | 405 | 39 |

The compositions of the present invention and their methods of use have been described above; however, modifications will be apparent to those of ordinary skill in the art and the scope of protection for the invention is to be defined by the claims that follow.

We claim:

1. A process for reducing the sulfur content of a gasoline fraction obtained from a fluid catalytic cracking process which comprises contacting a hydrocarbon feedstock with a conventional cracking catalyst in combination with a separate sulfur reduction additive consisting of porous montmorillonite clay.

2. The process as in claim 1, wherein the montmorillonite clay has a surface area in the range of 150 $m^2$/g to 350 $m^2$/g.

3. The process as in claim 1, wherein the sulfur content is reduced by at least 20%.

4. The process as in claim 1, wherein the montmorillonite clay is calcined in air at 550° C. prior to contacting with the hydrocarbon feedstock.

* * * * *